(12) United States Patent
Ghai et al.

(10) Patent No.: US 9,471,491 B2
(45) Date of Patent: *Oct. 18, 2016

(54) CACHE CONFIGURED TO LOG ADDRESSES OF HIGH-AVAILABILITY DATA

(71) Applicant: INTERNATIONAL BUSINESS MACHINES CORPORATION, Armonk, NY (US)

(72) Inventors: Sanjeev Ghai, Round Rock, TX (US); Guy Lynn Guthrie, Austin, TX (US); Hien Minh Le, Cedar Park, TX (US); Hugh Shen, Round Rock, TX (US); Philip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 266 days.

This patent is subject to a terminal disclaimer.

(21) Appl. No.: 14/073,553

(22) Filed: Nov. 6, 2013

(65) Prior Publication Data

US 2015/0127906 A1 May 7, 2015

(51) Int. Cl.
*G06F 12/00* (2006.01)
*G06F 12/08* (2016.01)
*G06F 12/12* (2016.01)
*G06F 11/14* (2006.01)

(52) U.S. Cl.
CPC ........... *G06F 12/0804* (2013.01); *G06F 11/14* (2013.01); *G06F 12/12* (2013.01); *G06F 12/0802* (2013.01); *G06F 12/0811* (2013.01); *G06F 12/0815* (2013.01); *G06F 12/0888* (2013.01); *G06F 12/0897* (2013.01); *G06F 2212/1016* (2013.01)

(58) Field of Classification Search
CPC ........... G06F 12/1009; G06F 2212/62; G06F 12/0811; G06F 12/0897; G06F 12/0893; G06F 12/0831
USPC ........................................................ 711/122
See application file for complete search history.

(56) References Cited

U.S. PATENT DOCUMENTS

| | | |
|---|---|---|
| 5,958,070 A | 9/1999 | Stiffler |
| 8,417,885 B2 | 4/2013 | Chou et al. |
| 8,504,873 B1 | 8/2013 | Deolasee |
| 2013/0024855 A1 | 1/2013 | North |
| 2013/0091335 A1 | 4/2013 | Mulcahy et al. |

*Primary Examiner* — Mardochee Chery
(74) *Attorney, Agent, or Firm* — Michael R. Long; Steven L. Bennett (57) ABSTRACT

A technique for operating a high-availability (HA) data processing system includes, in response to receiving an HA logout indication at a cache, initiating a walk of the cache to locate cache lines in the cache that include HA data. In response to determining that a cache line includes HA data, an address of the cache line is logged in a first portion of a buffer in the cache. In response to the first portion of the buffer reaching a determined fill level, contents of the first portion of the buffer are logged to another memory. In response to all cache lines in the cache being walked, the cache walk is terminated.

13 Claims, 6 Drawing Sheets

CACHE CONFIGURED TO LOG ADDRESSES OF HIGH-AVAILABILITY DATA

CROSS-REFERENCE TO RELATED APPLICATIONS

The present application is related to the following commonly assigned patent applications: U.S. patent application Ser. No. 14/048,474, entitled "TECHNIQUES FOR MOVING CHECKPOINT-BASED HIGH-AVAILABILITY LOG AND DATA DIRECTLY FROM A PRODUCER CACHE TO A CONSUMER CACHE," by Guy L. Guthrie et al.; and U.S. patent application Ser. No. 14/073,531, entitled "LOGGING ADDRESSES OF HIGH-AVAILABILITY DATA VIA A NON-BLOCKING CHANNEL," by Sanjeev Ghai et al., all of which are incorporated herein by reference in their entirety for all purposes.

BACKGROUND

The disclosure is generally directed to checkpoint-based high-availability systems and, more particularly, to techniques for logging addresses of high-availability data.

Computing may be thought of in terms of an application and a supporting platform. A supporting platform typically includes a hardware infrastructure of one or more processor cores, input/output, memory, and fixed storage (the combination of which supports an operating system (OS), which in turn supports one or more applications). Applications may be thought of as self-contained bundles of logic that rely on core object files and related resource files. As computing has become integral to modern industry, applications have become co-dependent on the presence of other applications. That is, a requisite environment for an application includes not only an underlying OS and supporting hardware platform, but also other key applications.

Key applications may include application servers, database management servers, collaboration servers, and communicative logic commonly referred to as middleware. Given the complexity of application and platform interoperability, different combinations of applications executing in a single hardware platform can demonstrate differing degrees of performance and stability. Virtualization technology interjects a layer between a supporting platform and executing applications. From the perspective of business continuity and disaster recovery, virtualization provides the inherent advantage of environment portability. For example, moving an entire environment configured with multiple different applications may be as simple as moving a virtual image from one supporting hardware platform to another.

In general, more powerful computing environments can support the coexistence of multiple different virtual images while maintaining a virtual separation between the images. Consequently, a failure condition in one virtual image typically cannot jeopardize the integrity of other co-executing virtual images in the same hardware platform. A virtual machine monitor (VMM) or hypervisor manages the interaction between each virtual image or virtual machine (VM) and underlying resources provided by a hardware platform. A bare metal hypervisor runs directly on the hardware platform similar to how an OS runs directly on hardware. In contrast, a hosted hypervisor runs within a host OS. In either case, a hypervisor can support the operation of different guest OS images or VM images (or simply VMs). The number of VMs is limited only by the processing resources of a VM container that holds the VMs or the hardware platform.

Virtualization has proven especially useful for end-users that require separate computing environments for different types of applications that are deployed on a single hardware platform. For example, a primary OS native to one type of hardware platform may provide a virtualized guest OS that is native to a different hardware platform (so that applications requiring the presence of the guest OS can co-exist with other applications requiring the presence of the primary OS). In this case, an end-user is not required to provide separate computing environments to support different types of applications. That is, irrespective of the guest OS, access to underlying resources of the single hardware platform remains static.

Virtualized environments have been deployed to aggregate different interdependent applications in different VMs in composing application solutions. For example, an application server can execute within one VM while a database management server executes in a different VM and a web server executes in yet another VM. Each of the VMs can be communicatively coupled to one another in a secure network and any given deployment of the applications can be live migrated to a different deployment without interfering with the execution of the other applications in the other VMs. In a typical live migration, a VM can be moved from one host server to another host server in order to, for example, permit server maintenance or to permit an improvement in hardware support for the VM.

Checkpoint-based high-availability (HA) is a technique in which a VM running on a primary host machine mirrors its processor and memory state every period (e.g., 25 mS) onto a secondary host machine. The mirroring process typically includes: tracking changes to the memory and processor state of the primary VM; periodically stopping the primary VM; sending the changes over a network to the secondary host machine; waiting for the secondary host machine to acknowledge receipt of the memory and processor state update; and resuming the primary VM. The mirroring process ensures that the secondary host machine is able to resume the workload with minimal loss of service should the primary host machine suffer a sudden hardware failure. If the secondary host machine either detects that the primary host machine is not responding or receives an explicit notification from the primary host machine, the secondary host machine starts the mirrored version of the VM and the appearance to the outside world is that the VM seamlessly continued to execute across the failure of the primary host machine.

Although the checkpoint-based HA technique provides effective protection against hardware failure, the checkpoint-based HA technique does not protect against software failure. Because the state of the processor and memory of a primary VM is faithfully reproduced on the secondary host machine, if a software crash (for example, the de-reference of a null pointer) causes a failover to the secondary host machine, a secondary VM resumes execution from the last checkpoint and, if the program execution is deterministic, the same error will occur. There are some constrained cases in which a VM may not crash if software failure triggered a failover. However, these cases are rare and rely more on luck than design. For example, a software bug that manifested as a race condition in which one processor could access data that was being modified by another processor might not occur when the workload was resumed on the secondary host machine, as by a fluke of scheduling the data may not end up being concurrently accessed.

BRIEF SUMMARY

A technique for operating a high-availability (HA) data processing system includes, in response to receiving an HA logout indication at a cache, initiating a walk of the cache to locate cache lines in the cache that include HA data. In response to determining that a cache line includes HA data, an address of the cache line is logged in a first portion of a buffer in the cache. In response to the first portion of the buffer reaching a determined fill level, contents of the first portion of the buffer are logged to another memory. In response to all cache lines in the cache being walked, the cache walk is terminated.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a processor configured to log addresses of high-availability (HA) data.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements. As used herein, the term 'system memory' is synonymous with the term 'main memory' and does not include 'cache' or 'cache memory'.

As noted above, checkpoint-based high-availability (HA) is a technique in which a virtual machine (VM) running on a 'primary host machine' regularly (e.g., every 25 mS) performs a 'checkpoint' that mirrors a processor and memory state of the primary host machine onto a 'secondary host machine'. The mirroring process involves: tracking changes to processor registers and memory of the VM; periodically stopping the VM; sending the tracked changes (e.g., over a network) to the secondary host machine; waiting for the secondary host machine to acknowledge receipt of the processor and memory state update; and resuming the VM on the primary host machine. This ensures that the secondary host machine is able to resume the workload with minimal loss of service should the primary host machine experience a sudden hardware failure.

In one or more conventional checkpoint-based HA implementations, a hypervisor identifies modified areas of VM memory using page protection in which all memory is marked read-only after a checkpoint. The hypervisor functions to: detect subsequent faults that occur when a store is first performed to a page of memory; restore original access permissions for the page; and mark the page as 'dirty' requiring transmission of the page at a next checkpoint. Conventionally, a VM employing checkpointing typically incurs more page protection faults than if checkpointing is not employed. It should be appreciated that conventionally a change to a single byte on a page requires the entire page to be transmitted to the secondary system, since once the page protection is removed there is no way to tell how much of the page was modified without using additional processor cycles and additional memory to compare the page against a copy of the original page. As a result of the requirement to send an entire dirty page to a secondary system, conventional HA systems typically use relatively small page sizes (e.g., 4K page sizes, as contrasted with 64K page sizes) to reduce traffic between primary and secondary systems. In this case, conventional HA system performance may be adversely affected as an operating system (OS) is not able to utilize large pages.

According to one or more aspects of the present disclosure, modifications to memory may be logged without page faults at a cache line granularity by maintaining a buffer that is populated with addresses (i.e., real addresses or a portion of real addresses) of cache lines that have been modified by a producer processor core (producer core) since the last checkpoint. The buffer can be inspected, either during checkpointing or speculatively prior to a checkpoint, in order to determine which cache lines need to be transmitted to the secondary system in order to maintain a consistent memory image. Maintaining the buffer in cache generally reduces page faults and reduces the traffic between primary and secondary systems due to the smaller granularity of modification (i.e., a cache line, rather than a page). The buffer approach is also page-size agnostic and, as such, HA systems can utilize larger page sizes without incurring page-size related performance penalties.

According to one or more embodiments of the present disclosure, logging a cache line address yields a significant performance advantage and complexity reduction over known approaches. In various embodiments, the disclosed techniques may be implemented in hardware, with some components implemented in cache and some parameters exposed via processor registers that are only accessible to privileged hypervisor code. In one or more embodiments, hypervisor software is modified to take advantage of added hardware features.

Within a cache hierarchy of many modern processor design there exists some form of cast-out machine and snoop-intervention machine. A cast-out machine is responsible for writing data evicted from the cache back to main memory (or system memory) or into a cache associated with another processor. A snoop-intervention machine is responsible for providing data from a given cache to another processor that is trying to gain access to a cache line that includes the data. Operation of the cast-out machine may be triggered by, for example, a requirement to free-up space in a cache for incoming data. Operation of the snoop-intervention machine may be triggered to, for example, provide another processor exclusive access to a cache line in the event that the processor wishes to modify data in the cache line. In general, during a checkpoint interval (i.e., a time between two checkpoints), every cache line modified between checkpoints is either resident as dirty data in a cache or has been through a cast-out or snoop-intervention machine. To log addresses of HA data that have not already been logged, a cache walk/scrub can be triggered at a checkpoint.

A cache flush/purge pushes dirty data out to main memory such that every cache line modified between checkpoints is guaranteed to have been through the cast-out machine. Cast-out/snoop-intervention machines may be modified so that, as well as writing dirty cache line data to memory/another cache, the machines can also operate in a mode in which the address of the modified cache line is written to a circular buffer that resides in cache. In order to increase efficiency, cache hardware may be configured to manage an intermediate buffer (e.g., a two cache line deep buffer) that collects an address (e.g., an 8-byte address) reported by cast-out and/or snoop-intervention machines. In one or more embodiments, when the intermediate buffer is filled with a full cache line payload of addresses, the cast-out machine (through a cast-out command) moves the contents of the intermediate buffer to the circular buffer. In at least one embodiment, each cache line in the intermediate buffer holds up to sixteen eight-byte addresses (e.g., one hundred twenty-eight bytes).

It should be appreciated that not all processor cores of a data processing system run in a producer mode at all times. A processor core that runs in the producer mode is referred to herein as a 'producer core'. A processor core may be placed into producer mode by setting a hardware flag that is accessible to a hypervisor. In a least one embodiment, when a processor core is in producer core mode, in order to manage writing to the circular buffer the cast-out machine maintains registers containing: a base (which is a pointer to base address of the buffer); a producer head (which is an offset within the buffer to which a next address will be written); a barrier (which is a boundary pointer); and a size (which is an indication of the size of the buffer).

In various embodiments, an HA log is maintained in memory that is separate from memory allocated to a virtual machine (VM) and is only accessible to a hypervisor. When in producer core mode, cast-out and snoop-intervention operations, in addition to the regular cast-out and/or snoop-intervention behavior, are configured to log addresses for modified cache lines to a currently-filling intermediate buffer (e.g., using ping-pong buffering so that one buffer can be filled while the other is being written back to main memory) of the cache. When in producer core mode, a cast-out machine is commanded to move cache lines from the intermediate buffer (as they fill) of the cache to the circular buffer in cache through the following behavior: issue a store of the cache line address to the producer head pointer; increment the producer head pointer, wrapping around to base if the producer head pointer goes to base+size; and if producer head is equal to the barrier, a fault is delivered to the hypervisor.

In one or more embodiments, when a checkpoint occurs: a hypervisor on a primary system suspends execution of a primary VM; a cache walk operation is triggered to generate entries for an HA log; and a consumer core, which may be a physically different core or the same core (but no longer in producer core mode), traverses the HA log. For each HA log entry the consumer core: reads an address; reads current data at the address from memory of the VM; transmits the (address, data) pair to a secondary system, where the (address, data) pair is used to update a memory image of a secondary VM; synchronizes other state (e.g., processor registers) with the secondary system; and then initiates resumption of execution of the primary VM.

A consumer core may implement various optimizations. For example, when a particular address has been cast-out several times in a checkpoint interval, the cast-out address will appear in a log multiple times. It should be appreciated that duplicate cast-out addresses only need to be transmitted to the secondary system once, as it is the current data in the memory of the VM that is transmitted and not the data at the time of cast-out (which is not logged). As such, the consumer core may perform some reduction in order to reduce bandwidth to the secondary system. As above, when the primary VM utilizes multiple processor cores and the same cache line is cast-out by more than one producer core during the same checkpoint interval, the address will appear in multiple logs but only needs to be transmitted once. Again, some reduction across HA logs can be performed to reduce bandwidth.

The consumer core may start to speculatively process the HA log of the producer core prior to the checkpoint. While speculatively processing the HA log of the producer core reduces the scope for reduction, speculatively processing the HA log of the producer core smoothes the data transfer to the secondary system and makes more efficient use of the available total bandwidth. It should be noted that the bulk of the working footprint utilized by the primary VM may reside in cache for the duration of time between checkpoints and the bulk of the logging occurs at checkpoint time. The natural caching by the hardware may do an efficient job at only logging a given cache line once even when the cache line has been stored to multiple times between checkpoints. The purpose of the barrier register is to ensure that no data is lost during a checkpoint operation due to a log wrap. The barrier points to the first log record in the checkpoint interval to ensure that data cannot be overwritten, based on the check of the producer head against the barrier.

In various embodiments, if the barrier is reached, then either a failover to the secondary system is initiated or all VM memory is resynchronized. The failover to the secondary system or VM memory resynchronization is desirable as there may be dirty data in the cache that has not yet been through the cast-out machine. In this case, it is not desirable to simply initiate an immediate checkpoint, as there is no where for the dirty addresses to be logged. In general, a hypervisor should both ensure that a log is appropriately sized and also monitor the producer head pointer regularly, initiating an early checkpoint if a log overflow is anticipated. If the consumer core is speculatively processing the log, the hypervisor may periodically move the barrier pointer along so that overflow is only triggered if the producer core collides with log entries that the consumer core has not already processed (in the event the consumer core falls behind).

As discussed above, cache hardware may be modified to ensure that at regular intervals a circular buffer in cache includes a list of all memory locations that have been modified since the last checkpoint by a given processor core. In general, the modifications cause a cast-out machine and snoop-intervention machine to log memory addresses leaving the cache between checkpoints and at a checkpoint initiate a cache flush to ensure that no modified data remains in the cache (thereby ensuring that modified data passes through the cast-out machine and is logged). A drawback of this approach is that a cache flush is required at every checkpoint interval. The cache flush results in additional pressure on the cast-out machine and memory subsystem and generally reduces performance of a workload that is running in highly-availability (HA) mode.

According to another approach, all addresses are guaranteed to be logged at a checkpoint interval without requiring a cache flush by introducing a new 'HA bit' for every cache line in a cache. The HA bit is asserted in response to a modification of the cache line when a processor core is running in producer core mode and may be de-asserted as part of a cache walk operation, which is executed at a checkpoint and walks the cache causing addresses for cache lines whose HA bit is asserted to be logged to the circular buffer. The HA bit is then de-asserted for all logged cache lines. In this implementation, the data associated with the cache line is not immediately written to main memory and the cache line is still marked as 'dirty' within the cache. Processor caches are typically implemented as lookup tables that associate an address (tag) with some data. The tag may be a virtual or a physical address, or some combination thereof, and the data is of a fixed size (e.g., a cache line). For any given tag there may be several locations in the cache where the data could be found and, as such, a cache lookup typically involves the inspection of a number of slots to find a matching tag. Additionally, slots may not contain any data and, as such, a slot typically includes not just the data to be associated with the tag, but also multiple flags.

According to another implementation, an HA bit is added to every slot in the cache. The HA bit is asserted when data associated with a cache line is updated by a processor core running in producer core mode. At a checkpoint, a cache walk operation traverses the entire cache, similar to a cache flush, but rather than examining the 'dirty bit' and pushing the data out to main memory, the cache walk operation instead examines the 'HA bit' and pushes the physical address out to the circular buffer.

In most computing systems, it is common to have several layers of cache (e.g., level 1 through level 'N' (i.e., L1 through LN), where L1 represents the fastest, smallest cache that is closest to the processor core and 'N' is typically 3 or 4 and tends to be slower and larger as 'N' increases). In one or more embodiments, a cache walk operation traverse all caches that may contain HA modified data, but this does not necessarily mean that all caches must be traversed, as cache levels may be write-through or write-back. As is known, write-through caches retain data in the cache, but also synchronously push the data to the next cache level to facilitate fast access times for subsequent reads. Writes for write-through caches are more expensive than in a write-back caches, since a writer must wait for write completion from the (slower) next level cache. Write-through caches do not need to be flushed. Write-back caches retain data in the cache and do not synchronously push the data to the next level in the cache. With write-back caches the process of writing to the cache is faster, at the expense of having to manage data coherency between caches in a symmetric multi-processor (SMP) system. The cost of writing to the next level in the cache is incurred when data is evicted from the cache to make room for additional data.

In a multi-layer cache hierarchy, only the write-back caches need to be traversed by a cache walk operation at a checkpoint. For example, in a system that includes a write-through L1 cache, a write-back L2 cache, and a write-back L3 cache, any write performed by a processor core will be written to the L1 cache and (since the L1 cache is a write-through cache) also be written to the L2 cache. In this case, dirty data in the L1 cache is also in the L2 cache. As more space is needed in the L2 cache, dirty data is evicted and becomes dirty data in the L3 cache. In this example, writes performed in producer core mode set the HA bit in the L2 cache for the associated cache line. When a cache line with the HA bit asserted in the L2 cache is cast-out to the L3 cache, the HA bit in the L3 cache associated with the cache line is asserted. In this example, the L1 cache does not require HA bits. At a checkpoint, the cache walk operation needs to traverse both the L2 and L3 caches, writing all the physical addresses for cache lines with the HA bit set to the circular buffer and clearing all the HA bits once the operation is complete.

The above descriptions describe enhancements to cache hardware to ensure that at regular intervals a circular buffer in cache stores a list of all memory locations that have been modified since the last checkpoint by a given processor core. The list of modified memory locations may be used to improve system performance and reliability. The list of modified memory locations (stored in a 'circular buffer', 'HA log', or 'HA table') is maintained by supporting caches, e.g., L2/L3 caches, and modified cache lines hold HA data. The HA log and HA data are processed by a consumer core to provide system reliability and redundancy. Conventionally, as the HA log is produced, the HA producer cache has written the HA log directly from a circular buffer in cache to main memory. As HA data is victimized out from cache associated with an HA producer core, the HA data has also conventionally been written to main memory.

To process the HA log and HA data, a consumer core has conventionally read both the HA log and the HA data from main memory. The conventional approach requires multiple accesses to main memory, incurs a relatively large bandwidth toll on memory resources, consumes power, and increases the time for the consumer core to processes the HA log and HA data, as compared to the techniques disclosed herein. In modern large servers, memory resource is at a premium and memory power is a major component of system power. According to various embodiments of the present disclosure, the time to process an HA log and HA data is reduced, which increases the time a system can devote to other tasks.

According to one or more embodiments of the present disclosure, a producer cache associated with an HA producer core moves an HA log (from a circular buffer in a producer cache) directly into a cache of an HA consumer core. According to various aspects, a producer cache also moves HA data stored in the producer cache directly into a cache of the consumer core. In this manner, the movement of HA log and HA data by a producer cache out to main memory followed by the consumer core having to fetch both the HA log and the HA data from the main memory is eliminated. As such, the required time for a consumer core to perform an HA system backup is reduced, the burden on memory resources is lowered, and power consumption associated with implementing HA is reduced.

In various embodiments, HA producer caches are configured to identify cache line addresses that should be put into the HA log. For HA log entries, an HA producer includes hardware registers to identify the location of the HA log. In one or more embodiments, an HA producer cache utilizes a system bus 'cache inject' command or 'forced cache inject' command to coherently install the HA log entry directly into a cache of an HA consumer core (instead of writing the HA log entry to main memory). The cache inject command is configured to maintain coherency since the producer core may not have ownership of the HA log cache line at the time of HA log writing. As is known, a cache inject command is a special system bus command that facilitates writing a cache line directly into a cache (e.g., a consumer cache). HA data can be distinguished from non-HA data based on an 'HA bit' in a directory of a producer cache that is used to track which cache lines were modified by an HA producer core.

In one or more embodiments, when a producer cache victimizes HA data, a lateral cast-out (LCO) command can be used to coherently transfer the HA data to a cache (on a same level, e.g., L2-L2, L3-L3) of an HA consumer core rather than main memory. The LCO command allows a producer cache to specifically target a cache of a consumer core for all HA data. In one or more embodiments, an LCO command is used to transfer HA data as a producer core already has ownership of the HA data and the LCO is more efficient. The consumer core, when processing the HA log (via normal loads), will find the HA log cache line entries already in its own level 2 (L2) and level 3 (L3) caches, which minimizes the time required to access the HA log (the HA log points to HA data cache lines). When a consumer core initiates HA data processing, those HA data cache lines are found already installed coherently in consumer core caches (e.g., L2 and L3 caches of the consumer core). Moving HA logs and HA data directly from a producer cache to a consumer cache reduces system bus traffic and latency associated with the consumer core processing HA log and HA data that is required to perform an HA backup of an HA system.

Figure 1:
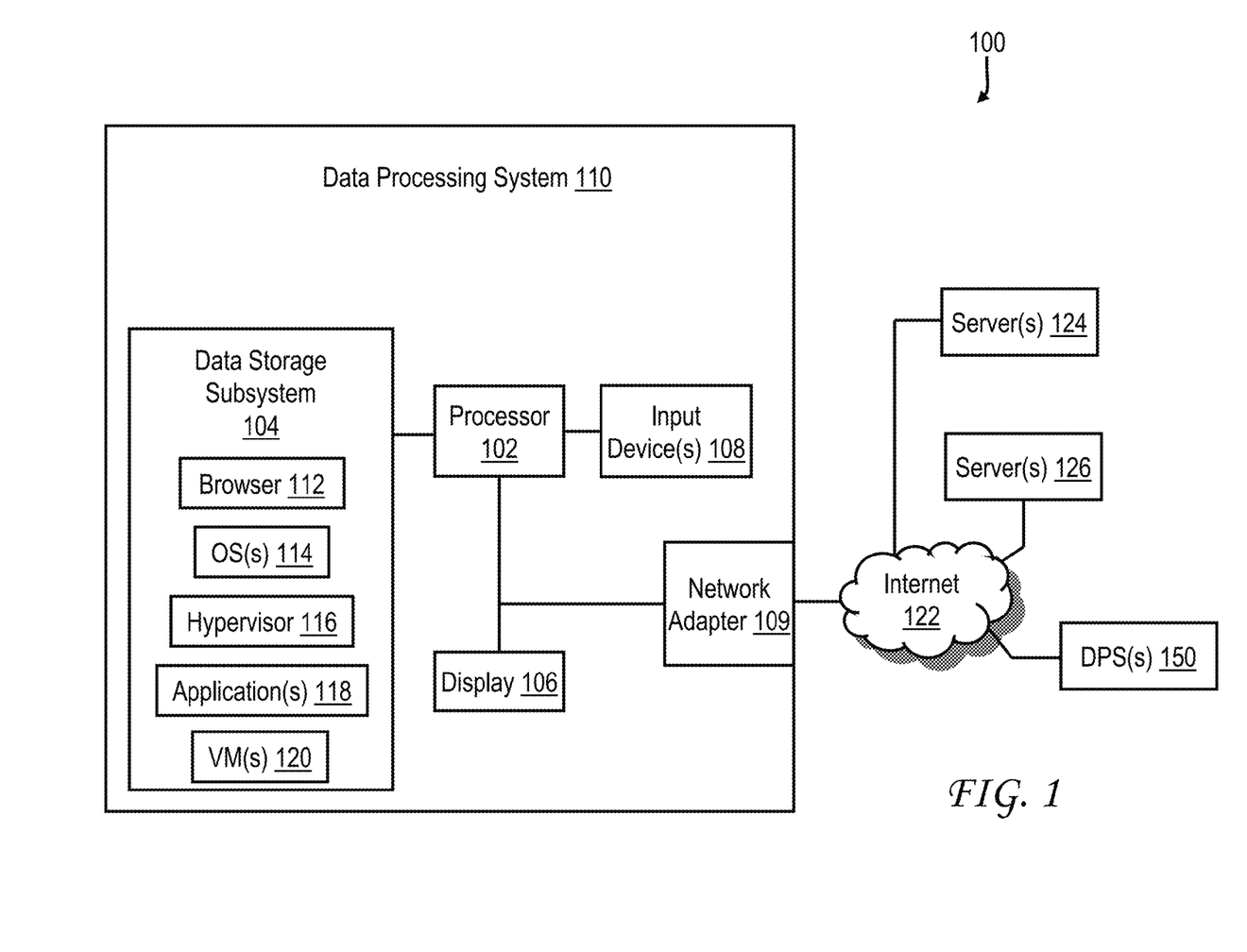
FIG. 1 is a diagram of a relevant portion of an exemplary data processing system environment that is configured to produce high-availability (HA) log and data according to the present disclosure.

With reference to FIG. 1, an exemplary data processing environment 100 is illustrated that includes a data processing system 110 that is configured, according to one or more embodiments of the present disclosure, to log addresses of high-availability (HA) data in an HA log. It should be appreciated that an HA log may reside in various locations. Data processing system 110 may take various forms, such as workstations, laptop computer systems, notebook computer systems, desktop computer systems or servers and/or clusters thereof. Data processing system 110 includes one or more processing units or processors 102 (each of which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 may also include application programs, such as a browser 112 (which may optionally include customized plug-ins to support various client applications), a hypervisor (or virtual machine monitor (VMM)) 116 for managing one or more virtual machines (VMs) 120 as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems (DPSs) 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
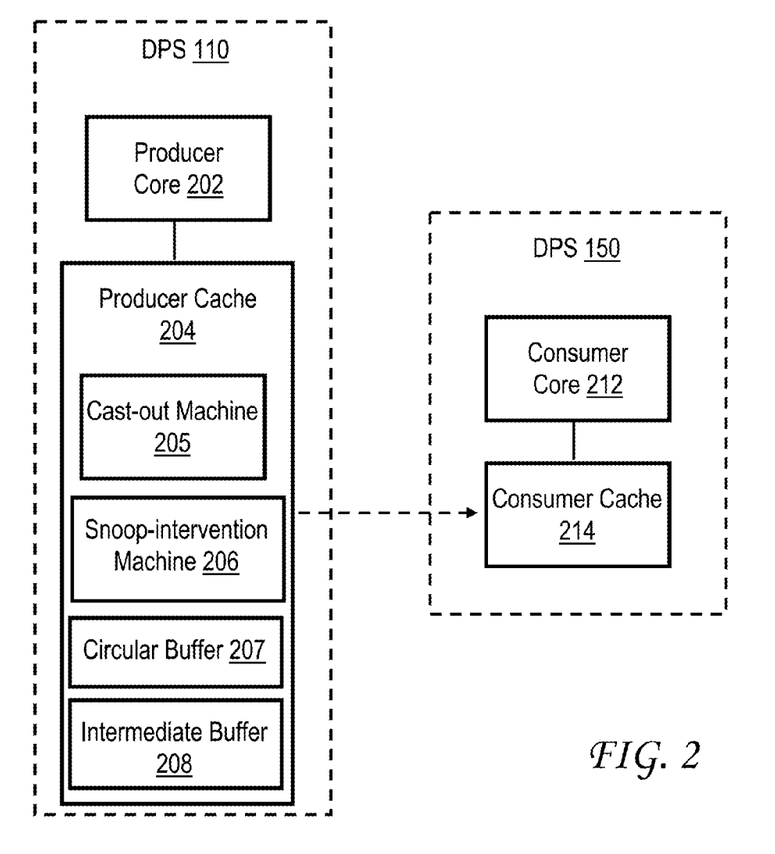
FIG. 2 is a diagram of a data processing system (that includes a producer core and a producer cache) and another data processing system (that includes a consumer core and a consumer cache) that may deployed in the data processing system environment of FIG. 1.

With reference to FIG. 2, relevant components of data processing systems (DPSs) 110 and 150 are illustrated in additional detail. DPSs 110 and 150 may include one or more processors 102 each of which include a level 1 (L1) instruction cache that is coupled to one or more other cache levels (e.g., level 2 (L2) and level 3 (L3) caches) that may be, for example, implemented in data storage subsystem 104. As is illustrated in FIG. 2, DPS 110 includes a producer core 202 that is coupled to a producer cache (e.g., including L2 and L3 caches) 204. As is illustrated, producer cache 204 may include a cast-out machine 205, a snoop-intervention machine 206, a circular buffer 207, and an intermediate buffer 208. Similarly, DPS 150 includes a consumer core 212 that is coupled to a consumer cache (e.g., including L2 and L3 caches) 214. While producer core 202/producer cache 204 and consumer core 212/consumer cache 214 are illustrated as being in different data processing systems, it should be appreciated that producer core 202, producer cache 204, consumer core 212, and consumer cache 214 may be implemented within a same data processing system that includes multiple processor cores.

Figure 3:
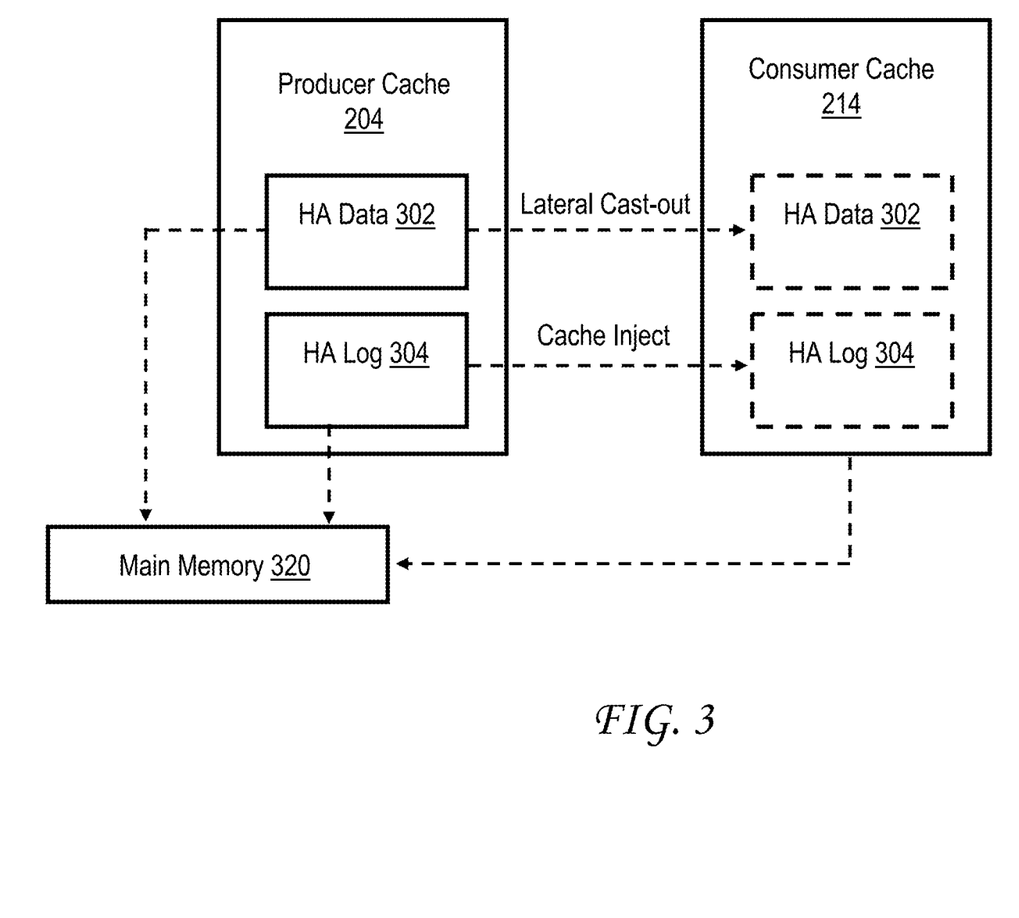
FIG. 3 is a diagram that depicts the transfer of HA log and data from the producer cache to the consumer cache of FIG. 2 (using a cache injection command and lateral cast-out command, respectively) according to an embodiment of the present disclosure.

With reference to FIG. 3, producer cache 204 is illustrated as storing HA data 302 and HA log 304 directly into consumer cache 214. HA data 302 and HA log 304 may be stored in a same cache level (e.g., L2 or L3 cache) or may be stored in different cache levels. Consumer cache 214 is illustrated as storing HA data 302 responsive to a lateral cast-out (LCO) command from producer cache 204. Consumer cache 214 is also illustrated as storing HA log 304 responsive to a cache injection command from producer cache 204. It should be appreciated that HA data 302 and HA log 304 may be moved directly from producer cache 204 to consumer cache 214 using other types of operations. In general, the time required by consumer core 212 to process HA log 304 and HA data 302 is greatly reduced, as consumer core 212 does not have to retrieve HA log 304 and HA data 302 from main memory 320. In this case, consumer cache 214 stores HA log 304 and HA data 302 to main memory 320. In an alternative embodiment, producer cache 204 stores HA log 304 and HA data 302 directly to main memory 320.

Figure 4:
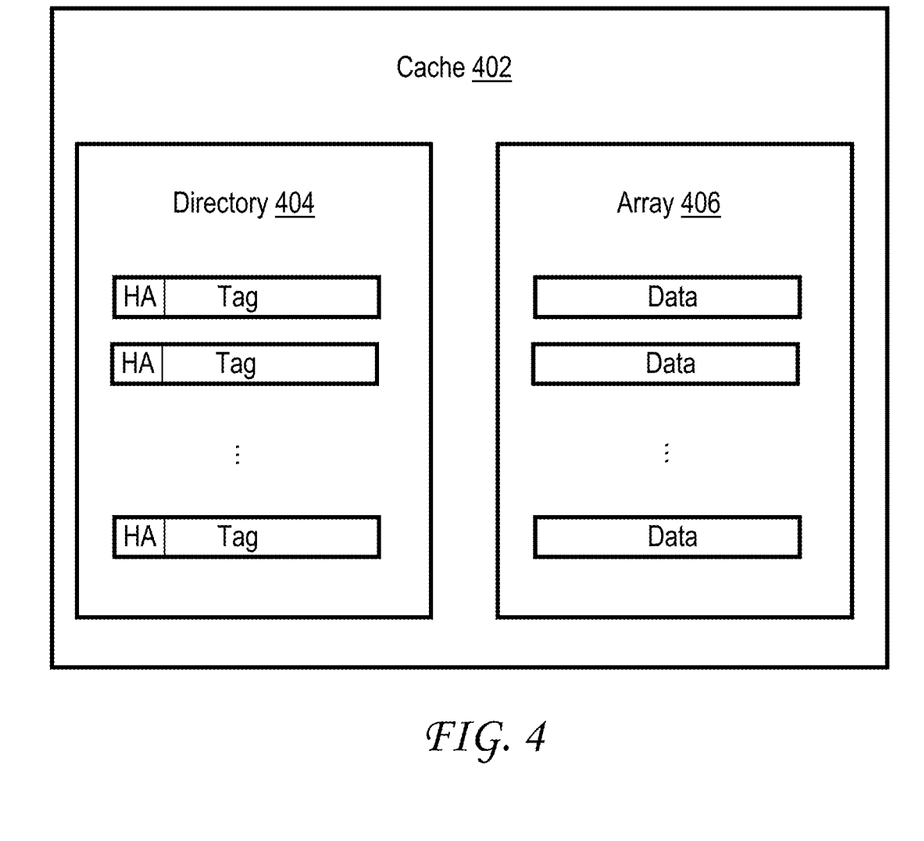
FIG. 4 is a diagram of a relevant portion of a cache whose directory includes an HA bit for each cache line to indicate whether an address of a cache line requires logging according to another embodiment of the present disclosure.

With reference to FIG. 4, an exemplary cache 402 (which may be implemented as producer cache 204) is depicted that includes a directory 404 (that includes a tag and an HA bit for each cache line) and an array 406 (that includes data). It should be appreciated that directory 404 may also include a number of flags (not shown) for each cache line. As mentioned above, the HA bit indicates whether an address for a cache line needs to be logged at a checkpoint or when the cache line is cast-out of the cache. The HA bit is asserted when data associated with a cache line is modified by producer core 202 (which is a processor core that is running in producer core mode). At a checkpoint, a cache walk operation (e.g., performed by cast-out machine 205) may traverse the entire producer cache 204 to examine the 'HA bit' for each cache line. A physical address for each cache line with an asserted HA bit is then written to HA log 304 (which may correspond to a circular buffer 207). In one or more embodiments, when HA log 304 is full (or at some other threshold level, e.g., three-quarters full), producer cache 204 moves (e.g., responsive to a cache injection command issued by snoop intervention machine 206) HA log 304 to consumer cache 214 for later processing.

In various embodiments, when HA data 302 is victimized (i.e., when a cache line is evicted from producer cache 204 to make room for additional data), producer cache 204 moves (e.g., responsive to issuance of a lateral cast-out command from cast-out machine 205) HA data 302 to consumer cache 214 for later processing. Alternatively, producer cache 204 may move (e.g., responsive to a lateral cast-out command) HA data 302 to consumer cache 214 prior to victimization. In any event, consumer core 212 utilizes HA log 304 to determine the location of HA data 302 when HA processing is initiated.

It should be appreciated that a producer core may have multiple separate HA data streams, logical partitions (LPARs), or VMs. At a checkpoint, every HA cache line (produced by an associated producer core since a previous checkpoint) has been cast-out of a local cache or is still resident in the local cache as HA data. According to the present disclosure, various techniques for creating an HA log of addresses for HA data in a producer cache at checkpoint (i.e., at HA logout) are disclosed. One approach for creating an HA log is to flush a cache at each checkpoint. As previously mentioned, a cache flush pushes all cache lines (including cache lines with HA data) out of the flushed cache. In this case, an HA log may be created by a cast-out machine during the casting out of the HA data. However, initiating a cache flush is not particularly efficient, as a cache flush causes both HA data and non-HA data to be flushed at each checkpoint which can have an adverse impact on performance. Furthermore, while writing addresses of HA data to an HA log, a cache flush unnecessarily writes all cache lines to another memory.

According to the present disclosure, efficient and flexible techniques are disclosed that enable a producer cache to simultaneously log only addresses of HA data for one or more streams of a producer core. In various embodiments, cache-walker logic is implemented to walk producer caches (e.g., L2 and L3 caches) to create a list of addresses of all cache lines currently residing in a cache that include HA data. The HA log may then be written to main memory or directly to a consumer cache. In this manner, content of the producer cache remains valid, as only an HA bit is cleared for each cache line that includes HA data while allowing HA data in a cache line to remain resident in a producer cache. According to one or more aspects of the present disclosure, a producer core initiates an HA checkpoint (HA logout) procedure when a hypervisor stops new HA traffic for a stream or streams to be checkpointed to ensure all previous and current HA log updates are visible so the updates may be logged.

According to one or more embodiments, a hypervisor issues a command (e.g., HA logout command) to request creation of an HA log for one or more HA data streams. A cache that receives the HA logout command treats the HA logout request as a barrier and ensures all older stores are committed to the cache before initiating the HA logout cache walk process. A cache that receives an HA logout request should ensure that the cache does not need to form a new HA cache line before initiating an HA logout to facilitate completion of the HA logout process without missing HA log entries. Following a determination that the cache does not need to form a new HA cache line, the cache starts cache-walker logic to walk the cache and ensure all HA cache lines for the requested HA data stream or streams are logged (i.e., the addresses of HA cache lines are logged). For example, an address of an HA cache line and its associated stream identifier (ID) may form an HA log entry (e.g., an 8-byte entry) that is recorded. As the address for the HA cache line is recorded, an HA bit associated with the HA line is de-asserted. De-asserting an HA bit in a directory of a cache provides an indication that an associated cache line has been processed.

In one or more embodiments, multiple HA entries are packed together into a larger package (usually a cache line), referred to as HA log block. When an HA log block is filled, a machine (e.g., a cast-out machine) is started to write the HA log block to main memory or directly to an HA consumer cache. In one or more embodiments, a higher level cache (e.g., an L2 cache) may be configured to send an HA log block to a lower level cache (e.g., an L3 cache). In one or more embodiments, the lower level cache then writes the HA log block to main memory or directly to an HA consumer cache. When the last HA cache line of the requested stream is processed, the cache places an end-of-record entry in the HA log, immediately following the last HA entry. The end-of-record entry is used as an indication for a consumer that the end-of-record entry is the last entry of the HA log for the checkpoint. Following writing of the end-of-record entry to the HA log, the cache indicates to hypervisor that the HA logout is complete. For example, a cache may set a walk complete status bit (of a status register) to indicate to hypervisor code that an HA logout is complete.

The above procedure describes an exemplary flow of an HA logout procedure for a single level cache system. It should be appreciated that the HA logout procedure can be extended to multiple level cache systems. For multiple level cache systems, the HA logout may start at the highest level cache and travel down a cache hierarchy. In this case, the higher level cache completes its HA logout (i.e., cache walk) before initiating a cache walk in a next cache level. A final walk completion occurs when the last cache level completes a cache walk. It should be appreciated that the HA logout procedure is applicable to many cache configurations. For example, the disclosed techniques are applicable to a multiple level cache hierarchy that includes: an L1 cache that is a write-through cache; an L2 cache that is a write-back cache and L1 cache inclusive; and an L3 cache that is a write back cache and L2 cache non-inclusive.

In various embodiments, an L2 cache sends an HA log block to an L3 cache to write the HA log block. For example, an L3 cache may write an HA log block for an L2 cache (on behalf of the L2 cache) to reduce duplication of HA log writing logic. When the L2 cache completes its logout sequence, the L2 cache sends a command to the L3 cache to start an L3 cache HA logout procedure. When the L3 cache completes its logout sequence, the L3 cache sends a complete signal back to the L2 cache. The L2 cache then sends a final HA logout completion to the producer core.

Figure 5:
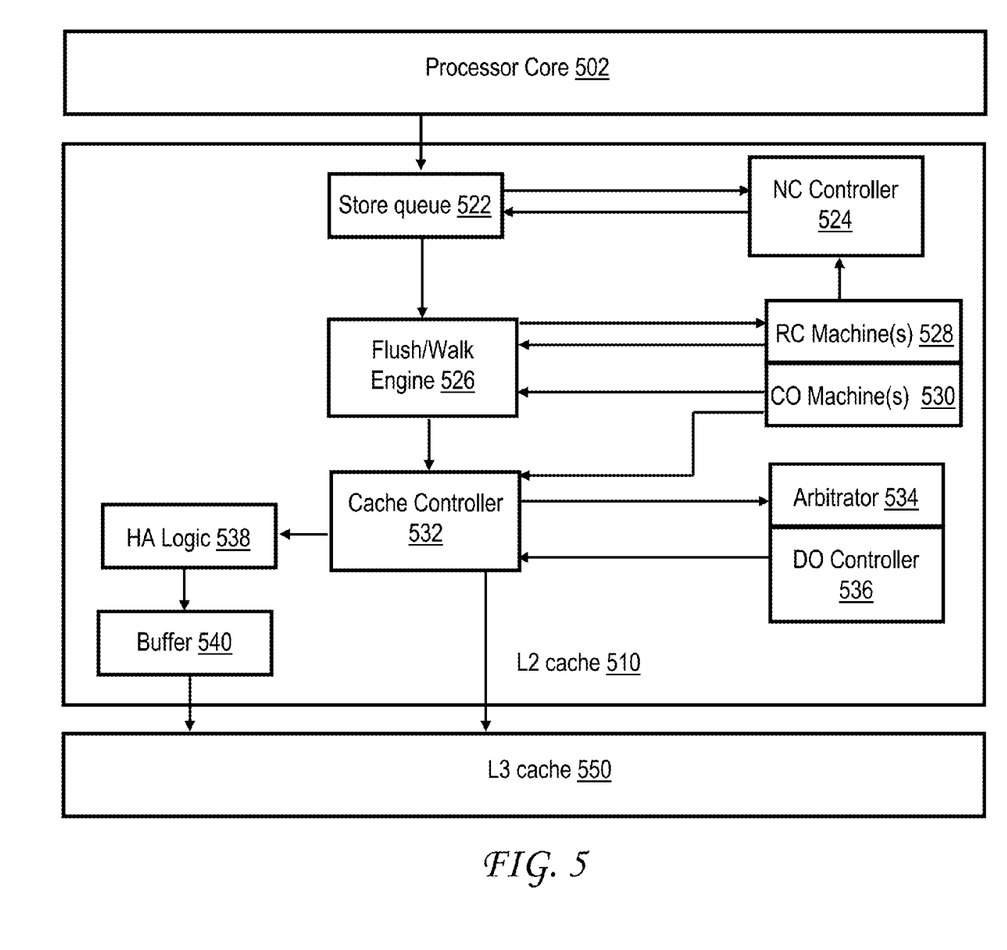
FIG. 5 is a diagram of relevant portions of a processor core, a level 2 (L2) cache, and an level 3 (L3) cache configured, according to an embodiment of the present disclosure, to log addresses of HA data.

With reference to FIG. 5, a relevant portion of a data processing system 500, configured to log addresses of HA data according to the present disclosure, is illustrated. Data processing system 500 may, for example, correspond to data processing system 110. As is shown, data processing system 500 includes a processor core 502, an L2 cache 510, and an L3 cache 550. To initiate a checkpoint, a hypervisor executing on processor core 502 may generate an HA logout signal that is communicated to a store queue (STQ) 522 of L2 cache 510 via a core interface unit (not shown). When the HA logout signal reaches the head of STQ 522, STQ 522 communicates the HA logout signal to non-cacheable (NC) controller 524, which is traditionally configured to handle various non-load and non-store operations, e.g., cache inhibit operations and synchronization operations. According to the present disclosure, NC controller 524 is also configured to initiate a cache walk of L2 Cache 510 in response to read-claim (RC) machines 528 indicating that all pending HA store operations are complete (i.e., successful dispatch). It should be appreciated that new HA cache lines may be created by RC machines 528 and cast-out (CO) machines 530. When NC controller 524 is notified by RC machines 528 that all HA store operations associated with HA loads and HA stores that were prior to the HA logout signal are complete, NC controller 524 communicates to STQ 522 that a cache walk of L2 cache 510 may be initiated.

In response to the communication from NC controller 524, STQ 522 communicates the HA logout command to flush/walk engine 526, which is modified according to the present disclosure to initiate a cache walk (as contrasted with a cache flush) in response to the HA logout signal. Alternatively, a hypervisor may communicate directly with flush/walk engine 526 to initiate an HA logout procedure via a serial communication (SCOM) interface (not shown). Following receipt of the HA logout command, flush/walk engine 526 walks a directory of L2 cache 510 to locate HA cache lines (i.e., flush/walk engine 526 examines an HA bit associated with each cache line) and communicates with RC machines 528 to initiate creation of HA log entries. In response to a communication from flush/walk engine 526 to create HA log entries, RC machines 528 create HA log entries and communicate with CO machines 530 to initiate transfer of the created HA log entries to buffer 540. CO machines 530 communicate transfer requests for HA log entries to cache controller 532.

In response to the transfer requests, cache controller 532 utilizes HA logic 538 to store HA log entries in appropriate locations (e.g., in appropriate positions in a ping portion or a pong portion) in buffer 540. When a ping portion or a pong portion of, for example, buffer 540 is full, cache controller 532 requests permission to utilize a bus (not shown) from arbitrator 534. When arbitrator 534 grants access to the bus, content of the ping or pong portion of buffer 540 is transferred to L3 cache 550 via the memory bus. L3 cache 550 may then cache inject the content of the ping or pong portion of buffer 540 into a consumer cache or transfer the content of the ping or pong portion of buffer 540 to main memory. A data output (DO) controller 536 notifies cache controller 532 when the content of buffer 540 is transferred so that the ping or pong portion of buffer 540 can be reused, at which point the cache walk is resumed until L2 cache 510 has been completely walked (as indicated by all of CO machines 530 that are creating HA log entries providing an inactive signal, which indicates that all of the CO machines 530 are through making HA log entries, to flush/walk engine 526).

Upon reaching the end of a cache walk, flush/walk engine 526 transmits an 'HA logout end' signal to cache controller 532. In response to receiving the HA logout end signal, cache controller 532 may initiate padding (assuming content of a ping or pong portion of buffer 540 is not full) the content of buffer 540 or initiate insertion of an end-of-record indicator in buffer 540 and initiate forwarding the content of the ping or pong portion of buffer 540 to L3 cache 550. Cache controller 532 then signals L3 cache 550 to begin an HA logout procedure. It should be appreciated that the L3 cache 550 is similarly configured to L2 cache 510. That is, L3 cache 550 performs an HA logout procedure similar to the HA logout procedure described with respect to L2 cache 510 following receipt of the HA logout signal.

Figure 6:
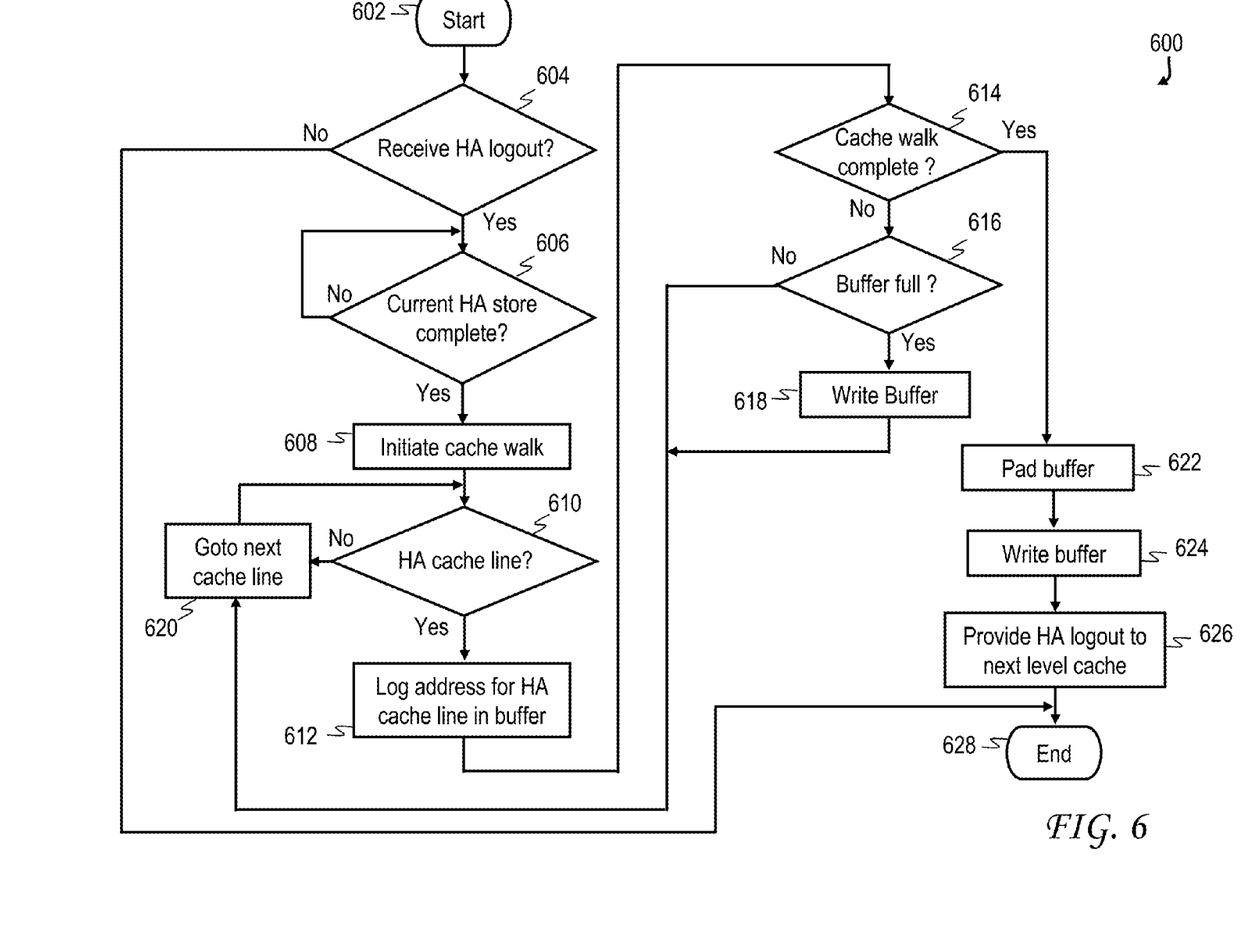
FIG. 6 is a flowchart of an exemplary process for logging addresses of HA data according to another embodiment of the present disclosure.

With reference to FIG. 6, a process 600 for logging addresses of HA data is illustrated that is initiated in block 602 each time, for example, a cache (e.g., L2 cache 510) receives a command from a processor core (e.g., processor core 502). Next, in decision block 604, L2 cache 510 determines whether the received command corresponds to an HA logout signal. When the received command does not correspond to an HA logout signal in block 604, control transfers to block 628 where process 600 terminates. When the received command corresponds to an HA logout signal in block 604, control transfers to decision block 606 where L2 cache 510 determines whether current RC operations (i.e., HA stores) that were initiated prior to an HA logout command reaching a head of store queue 522) are complete. In response to RC operations not being complete in block 606, control loops on block 606. In response to RC operations being complete in block 606, control transfers to block 608 where a cache walk is initiated.

Next, in decision block 610, L2 cache 510 determines whether a current cache line is an HA cache line by examining an associated HA bit (see FIG. 4) in a directory of L2 cache 510. In response to the cache line not being an HA cache line in block 610, control transfers to block 620 where the cache walk advances to a next cache line and then to block 610. In response to the cache line being an HA cache line in block 610, control transfers to block 612 where L2 cache 510 logs an address for the HA cache line in buffer 540.

Then, in decision block 614, L2 cache 510 determines whether the cache walk is complete. In response to the cache walk being complete in block 614, control transfers to block 622 where L2 cache 510 pads content (of a relevant portion) of buffer 540, if required. Next, in block 624, L2 cache 510 writes the content of buffer 540 to a lower level cache (e.g., L3 cache 550). Then, in block 626, L2 cache 510 provides an HA logout signal to L3 cache 550. Following block 626, process 600 terminates in block 628. In response to the cache walk not being complete in block 614, control transfers to decision block 616. In block 616, L2 cache 510 determines whether buffer 540 is full. In response to buffer 540 not being full in block 616, control transfers to block 620 where the cache walk advances to a next cache line and then to block 610. In response to buffer 540 being full in block 616 control transfers to block 618 where L2 cache 510 writes content of buffer 540 to L3 cache 550, at which point control transfers to block 620 where the cache walk advances to a next cache line and then to block 610.

Accordingly, techniques have been disclosed herein that log addresses of high-availability (HA) data at a checkpoint during a cache walk.

In the flow charts above, the methods depicted in FIG. 6 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A high-availability (HA) data processing system, comprising:
   a producer core; and
   a producer cache coupled to the producer core, wherein the producer cache is configured to:
      in response to receiving an HA logout indication, initiate a walk of the cache to locate cache lines in the cache that include HA data;
      in response to determining that a cache line includes HA data, log an address of the cache line in a first portion of a buffer in the cache;
      in response to the first portion of the buffer reaching a determined fill level, transfer contents of the first portion of the buffer to another memory; and
      in response to all cache lines in the cache being walked, terminate the cache walk.

2. The data processing system of claim 1, wherein the producer cache is further configured to:
   in response to the first portion of the buffer not reaching the determined fill level prior to the cache walk terminating, pad the first portion of the buffer and then transferring the content of the first portion of the buffer to the another memory.

3. The data processing system of claim 1, wherein the producer cache is further configured to:
   in response to the first portion of the buffer reaching the determined fill level, log addresses for subsequent ones of the cache lines that include HA data into a second portion of the buffer; and
   in response to the second portion of the buffer reaching the determined fill level, transfer the contents of the second portion of the buffer to the another memory.

4. The data processing system of claim 3, wherein the producer cache is further configured to:
   in response to the second portion of the buffer not reaching the determined fill level prior to the cache walk terminating, pad the second portion of the buffer and then transfer the content of the second portion of the buffer to the another memory.

5. The data processing system of claim 1, wherein the HA logout indication is received by the cache via a serial communication interface or via a store queue.

6. The data processing system of claim 1, wherein the cache is a level 2 (L2) cache and the another memory is a level 3 (L3) cache.

7. The data processing system of claim 1, wherein the cache walk is not initiated until all pending HA store operations are complete.

8. A processor, comprising:
   a processor core; and
   a cache coupled to the processor core, wherein the cache is configured to:

in response to receiving an HA logout indication, initiate a walk of the cache to locate cache lines in the cache that include HA data;

in response to determining that a cache line includes HA data, log an address of the cache line in a first portion of a buffer in the cache;

in response to the first portion of the buffer reaching a determined fill level, transfer contents of the first portion of the buffer to another memory; and in response to all cache lines in the cache being walked, terminating the cache walk.

9. The processor of claim 8, wherein the cache is further configured to:

in response to the first portion of the buffer not reaching the determined fill level prior to the cache walk terminating, pad the first portion of the buffer and then transferring the content of the first portion of the buffer to the another memory.

10. The processor of claim 8, wherein the cache is further configured to:

in response to the first portion of the buffer reaching the determined fill level, log addresses for subsequent ones of the cache lines that include HA data into a second portion of the buffer; and in response to the second portion of the buffer reaching the determined fill level, transfer the contents of the second portion of the buffer to the another memory.

11. The processor of claim 10, wherein the cache is further configured to:

in response to the second portion of the buffer not reaching the determined fill level prior to the cache walk terminating, pad the second portion of the buffer and then transferring the content of the second portion of the buffer to the another memory.

12. The processor of claim 8, wherein the processor core has multiple HA data streams and the HA logout indication is received by the cache via a serial communication interface or via a store queue.

13. The processor of claim 8, wherein the cache is a level 2 (L2) cache and the another memory is a level 3 (L3) cache, and wherein the cache walk is not initiated until all pending HA store operations are complete.

* * * * *